United States Patent
Fang et al.

(10) Patent No.: US 10,482,612 B2
(45) Date of Patent: Nov. 19, 2019

(54) OBJECT TRACKING METHOD AND OBJECT TRACKING APPARATUS

(71) Applicant: Nissan Motor Co., Ltd., Yokohama-shi, Kanagawa (JP)

(72) Inventors: Fang Fang, Kanagawa (JP); Kuniaki Noda, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/311,608

(22) PCT Filed: Jun. 30, 2016

(86) PCT No.: PCT/JP2016/069420
§ 371 (c)(1),
(2) Date: Dec. 19, 2018

(87) PCT Pub. No.: WO2018/003056
PCT Pub. Date: Jan. 4, 2018

(65) Prior Publication Data
US 2019/0244368 A1 Aug. 8, 2019

(51) Int. Cl.
*G06T 7/246* (2017.01)
(52) U.S. Cl.
CPC .................. *G06T 7/246* (2017.01)
(58) Field of Classification Search
CPC ..................................... G06T 7/246
(Continued)

(56) References Cited

U.S. PATENT DOCUMENTS 7,620,207 B2 * 11/2009 Brodsky .............. G06K 9/32
382/103
8,045,757 B2 10/2011 Tsunashima
(Continued)

FOREIGN PATENT DOCUMENTS

CN 101799985 A 8/2010
JP 2007334631 A 12/2007
(Continued)

OTHER PUBLICATIONS

Lin, Shin-Ping, Yuan-Hsin Chen, and Bing-Fei Wu. "A real-time multiple-vehicle detection and tracking system with prior occlusion detection and resolution, and prior queue detection and resolution." 18th International Conference on Pattern Recognition (ICPR'06). vol. 1. IEEE, 2006. (Year: 2006).*
(Continued)

*Primary Examiner* — Jonathan S Lee
(74) *Attorney, Agent, or Firm* — Young Basile Hanlon & MacFarlane, P.C.

(57) ABSTRACT

In a case where multiple objects detected by an object detector enter a hidden area calculated by a hidden area calculator, a positional relationship estimator estimates a positional relationship between the multiple objects in the hidden area based on: information about each of the multiple objects; and lanes and routes into which each of the multiple objects may change their courses, and which are calculated by a route calculator. When the objects come out of the hidden area, an identification number assigner determines identification information about each object based on the positional relationship estimated by the positional relationship estimator.

6 Claims, 16 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 8,908,915 | B2* | 12/2014 | Chuang | G06T 7/246 382/103 |
| 2008/0002857 | A1 | 1/2008 | Tsunashima | |
| 2009/0002489 | A1* | 1/2009 | Yang | G06K 9/00771 348/143 |
| 2011/0081043 | A1* | 4/2011 | Sabol | G06T 7/254 382/103 |
| 2011/0199372 | A1* | 8/2011 | Porter | G06T 7/251 345/419 |
| 2012/0188342 | A1* | 7/2012 | Gervautz | G06T 7/246 348/46 |
| 2014/0347475 | A1* | 11/2014 | Divakaran | G06K 9/00771 348/135 |
| 2015/0310273 | A1* | 10/2015 | Shreve | G06K 9/00624 382/103 |

FOREIGN PATENT DOCUMENTS

| | | | | |
|---|---|---|---|---|
| JP | | 2010176302 A | 8/2010 | |
| JP | | 2012118603 A | 6/2012 | |
| JP | | 2012221452 A | 11/2012 | |
| JP | | 2016001463 A | 1/2016 | |
| WO | WO-2007147171 A2 * | 12/2007 | | H04N 5/247 |

OTHER PUBLICATIONS

Hsieh, Jun-Wei, et al. "Automatic traffic surveillance system for vehicle tracking and classification." IEEE Transactions on Intelligent Transportation Systems 7.2 (2006): 175-187. (Year: 2006).*

Liu, Liwei, et al. "Semantic superpixel based vehicle tracking." Proceedings of the 21st International Conference on Pattern Recognition (ICPR2012). IEEE, 2012. (Year: 2012).*

Pan, Jiyan, and Bo Hu. "Robust occlusion handling in object tracking." 2007 IEEE Conference on Computer Vision and Pattern Recognition. IEEE, 2007. (Year: 2007).*

Lin et al., "Vehicle Re-Identification With Dynamic Time Windows for Vehicle Passage Time Estimation", IEEE TITS, vol. 12, No. 4, Dec. 2011, pp. 1057-1063.

Lei B et al., "Real-time outdoor video surveillance with robust foreground extraction and object tracking via multi-state transition management", Pattern Recognition Letters, Elsevier, Amsterdam, NL, vol. 27, No. 15, 99.1816-1825, Nov. 1, 2006.

* cited by examiner

TIME t

TIME t+1

TIME t+2

TIME t+3

FIG. 5

| DETECTION ORDER ZONE | TRACKER T1 | TRACKER T2 |
|---|---|---|
| FIRST ZONE Y | | ○ |
| FIRST ZONE X | ○ | |
| SECOND ZONE Y (FIRST ZONE Y) | ○ | |
| SECOND ZONE Y (FIRST ZONE X) | | ○ |
| SECOND ZONE X (FIRST ZONE X) | | ○ |
| SECOND ZONE X (FIRST ZONE Y) | ○ | |

TIME t

TIME t+1

TIME t+2

TIME t+3

| DETECTION ORDER ZONE | TRACKER T1 | TRACKER T2 | NEW TRACKER |
|---|---|---|---|
| FIRST ZONE Y | | O | |
| FIRST ZONE X | O | | |
| FIRST ZONE Z | | | O |
| SECOND ZONE Z (FIRST ZONE Z) | | | O |
| SECOND ZONE Z (FIRST ZONE Y) | O | | |
| SECOND ZONE Z (FIRST ZONE X) | | O | |
| SECOND ZONE Y (FIRST ZONE Z) | | O | |

TIME t

TIME t+1

TIME t+2

TIME t+2

TIME t+3

OBJECT TRACKING METHOD AND OBJECT TRACKING APPARATUS

TECHNICAL FIELD

The present invention relates to an object tracking method and an object tracking apparatus.

BACKGROUND

A method of continuing to track an object in a case where the object overlaps and is hidden behind another object has been known (Japanese Patent Application Publication No. 2007-334631). According to Japanese Patent Application Publication No. 2007-334631, it is determined whether the hidden object reappears based on estimated information about the object, and an identical identification number is assigned to the object when the object reappears.

In a case, however, where multiple objects are simultaneously hidden behind a different object and conditions of the multiple objects change while the multiple objects are being hidden behind the different object, the technique of the Japanese Patent Application Publication No. 2007-334631 is likely to make the estimated information deviate from the actual state and accordingly assign wrong identification numbers to the objects which reappear.

SUMMARY

The present invention has been made with the above problem taken into consideration. An object of the present invention is to provide an object tracking method and an object tracking apparatus which, even in a case where multiple objects enter a hidden area and temporarily disappear, are capable of preventing each object from being assigned wrong identification information different from that which is assigned to the object before the object is hidden.

An object tracking apparatus according to one aspect of the present invention estimates a positional relationship between multiple objects in a hidden area in a case where the multiple objects enter the hidden area. When the multiple objects come out of the hidden area, the object tracking apparatus determines identification information about each object based on the estimated positional relationship.

Even in the case where the multiple objects enter the hidden area and temporarily disappear, the present invention makes it possible to prevent each object from being assigned wrong identification information different from that which is assigned to the object before the objects is hidden.

BRIEF DESCRIPTION OF THE DRAWINGS

FIG. 5 is a diagram for explaining a tracker of an object which comes out of a hidden area in the first embodiment of the present invention;

DETAILED DESCRIPTION

Figure 1:
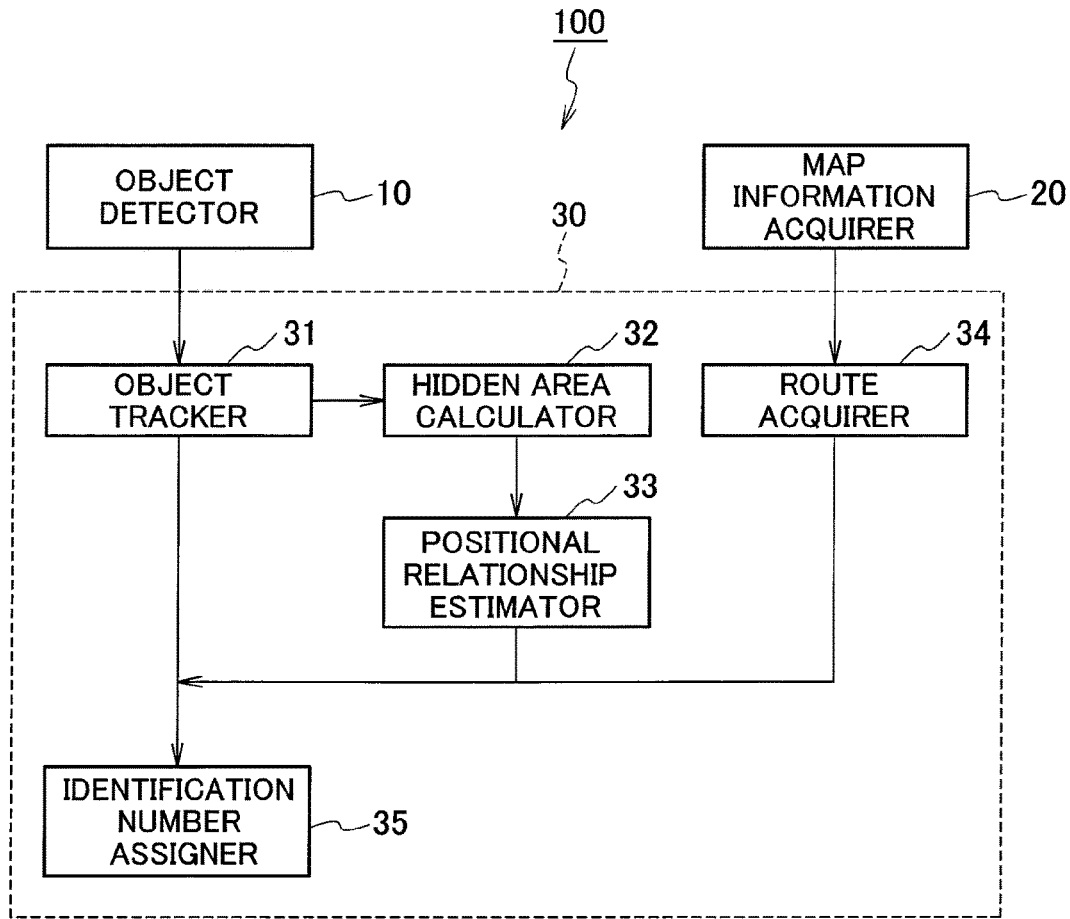
FIG. 1 is a configuration diagram of an object tracking apparatus according to a first embodiment of the present invention.

Referring to the drawings, descriptions will be hereinbelow provided for embodiments of the present invention. The same components will be denoted by the same reference signs throughout the drawings, and descriptions will be omitted.

First Embodiment

Referring to FIG. 1, descriptions will be provided for an object tracking apparatus 100 according to a first embodiment. As illustrated in FIG. 1, the object tracking apparatus 100 includes an object detector 10, a map information acquirer 20, and a controller 30.

The object detector 10 is a sensor for detecting objects around a moving body (vehicle) periodically, and is, for example, a laser range finder. The laser range finder detects objects (pedestrians, bicycles, motorbikes, other vehicles) which are around (for example, within 30 m from) a host vehicle as the moving body. To put it specifically, the laser range finder scans a laser beam within a certain angle range, and receives a reflected laser beam to detect a time difference between the time of emitting the laser beam and the time of receiving the reflected laser beam. Thereby, the laser range finder detects the distance and speed of each object relative to the host vehicle, as well as a direction in which the object is moving. The object detector 10 outputs information about the detected objects to the controller 30. Incidentally, an infrared sensor, an ultrasonic sensor, a camera or the like may be used as the object detector 10. The object detector 10 outputs the detection result to the controller 30.

The map information acquirer 20 is a device for acquiring map information, and is, for example, a navigation system. The map information is about, for example, the number of lanes in a roadway, junction points, traffic rules, and the like. The map information acquirer 20 outputs the acquired map information to the controller 30. Incidentally, the map information acquirer 20 may be configured to acquire the map information from a recording medium, or from a server.

The controller 30 is a circuit for processing the data acquired from the object detector 10 and the map information acquirer 20, and is formed from, for example, an IC, an LSI, or the like. From a functional viewpoint, the controller 30 may be divided into an object tracker 31, a hidden area calculator 32, a positional relationship estimator 33, a route calculator 34, and an identification number assigner 35.

The object tracker 31 tracks an object by associating parameters of the object as currently detected and parameters of the object as previously detected. The parameters of an object represents the position of the object, the speed of the object, the size of the object, the direction in which the object is moving, the color of the object, and the like. In a case where the parameters of an object as previously detected cannot be associated with the parameters of any object as currently detected, the object tracker 31 determines that the previously-detected object has disappeared. Furthermore, in a case where an object has disappeared from the detection range of the sensor, the object tracker 31 determines that the object has entered a hidden area.

The hidden area calculator 32 calculates a hidden area. The hidden area is an area where an object is hidden behind an obstacle and accordingly cannot be detected by the object detector 10. Detailed descriptions will be provided for the hidden area later.

In a case where the object tracker 31 determines that multiple objects have disappeared, the positional relationship estimator 33 estimates a positional relationship between the hidden multiple objects by use of the parameters of the multiple objects which are obtained before the disappearance of the multiple objects.

Based on the map information acquired from the map information acquirer 20, the route calculator 34 calculates lanes and routes into which the hidden objects may change their courses.

The identification number assigner 35 assigns an identification number to each object detected by the object detector 10. Furthermore, the identification number assigner 35 continuously assigns the same identification number to each object whose current and previous parameters are associated with each other by the object tracker 31, and assigns a new identification number to each newly-detected object. Moreover, based the positional relationship between the multiple objects which are acquired from the positional relationship estimator 33, as well as the routes and the like into which the multiple objects may change their courses and which are acquired from the route calculator 34, the identification number assigner 35 assigns an identification number to each object which comes out of the hidden area.

Figure 2A:
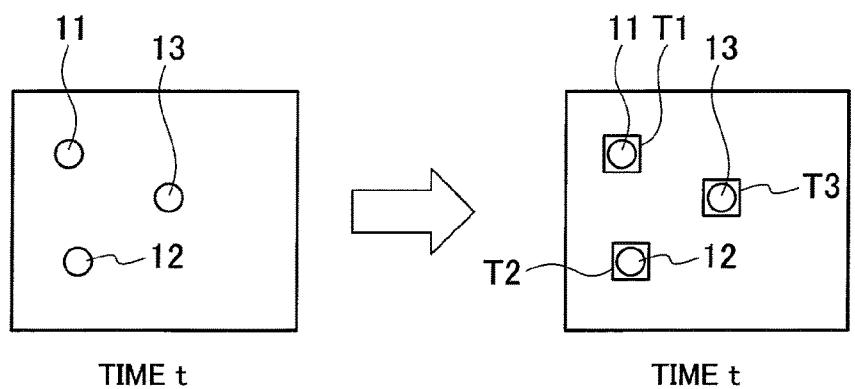
FIG. 2A is a diagram for explaining an object tracking method according to the first embodiment of the present invention.
Figure 2B:
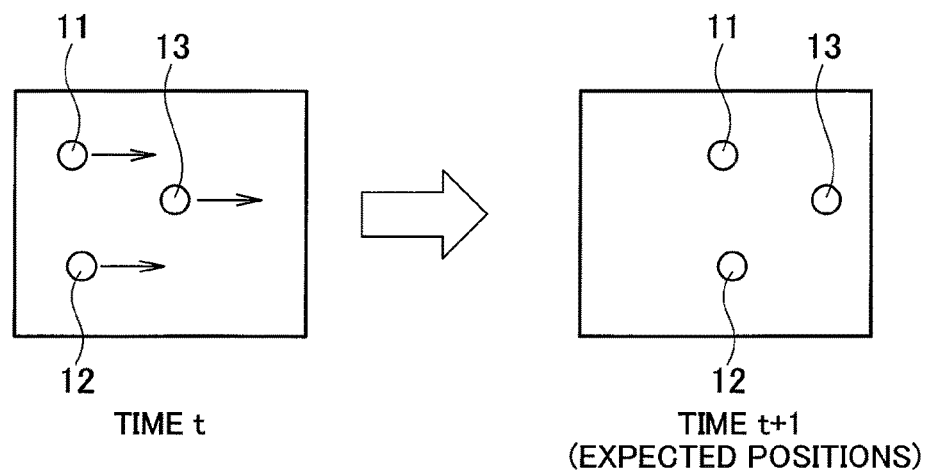
FIG. 2B is another diagram for explaining the object tracking method according to the first embodiment of the present invention.
Figure 2C:
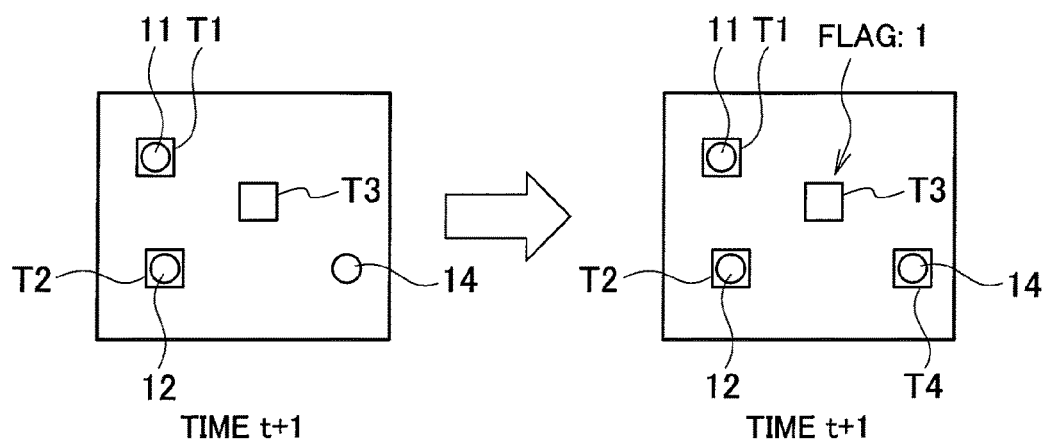
FIG. 2C is yet another diagram for explaining the object tracking method according to the first embodiment of the present invention.

Next, referring to FIGS. 2A to 2C, descriptions will be provided for how an object tracking method is performed, and what process is performed how in a case where an object disappears. As illustrated in FIG. 2A, in a case where the object detector 10 detects objects 11 to 13 at time t, the object tracker 31 sets trackers T1 to T3 to the objects 11 to 13. A tracker is information about the positon and speed of the corresponding object. Furthermore, the identification number assigner 35 assigns identification numbers ID1 to ID3 to the objects 11 to 13. Incidentally, in the first embodiment, a tracker and an identification number are included in identification information to be used to track the corresponding object.

Thereafter, as illustrated in FIG. 2B, based on the position information and speed information about each of the objects 11 to 13, the object tracker 31 estimates positions at which the respective objects 11 to 13 are expected to be at time t+1. Subsequently, as illustrated in FIG. 2C, based on the estimated positions, the object tracker 31 moves the trackers T1 to T3. After that, the object tracker 31 matches the information about the object 11 detected at time t+1, the information about the object 12 detected at time t+1, and the information about the object 14 detected at time t+1 with the trackers T1 to T3 which are moved at time t. The object tracker 31 sets a new tracker T4 to an object 14 whose tracker cannot be found within a certain distance (for example, 6 m) from the object 14. In contrast, the object tracker 31 changes the flag of the tracker T3 from 0 to 1, because the object corresponding to the tracker T3 currently does not exist within the certain distance from the tracker T3 although existing more than a certain number of times in the past time. The object tracker 31 continues estimating the position of the object corresponding to the tracker T3 using the position information and speed information which the tracker T3 has. In the first embodiment, there are two types of flag which is set for the tracker: 0 and 1. The flag 1 means that no corresponding object exists within the certain distance from the tracker. The flag 0 means that a corresponding object exists within the certain distance from the tracker. In the example illustrated in FIG. 2C, the flags of the respective trackers T1, T2 are set at 0.

Figure 3:
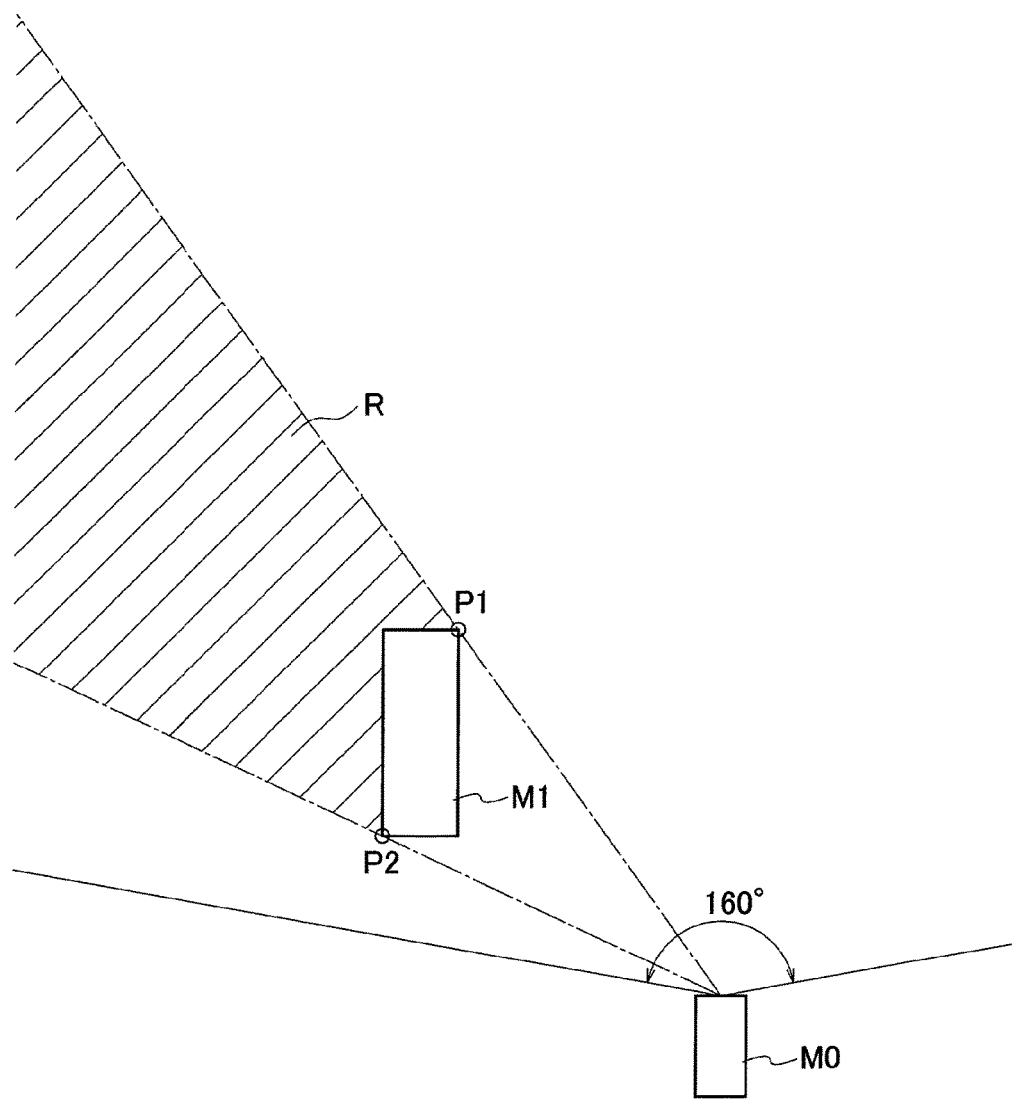
FIG. 3 is a diagram for explaining a hidden area according to the first embodiment of the present invention.

Next, referring to FIG. 3, descriptions will be provided for the hidden area. In the first embodiment, as illustrated in FIG. 3, the detection range of the object detector 10 is 160° in front of the host vehicle. Incidentally, this is one example of the detection range, and the detection range is widened when the sensor is mounted on a side of the vehicle, or the rear of the vehicle. In the detection range illustrated in FIG. 3, the hidden area calculator 32 calculates a hidden area R. To put it specifically, in a case where the object detector 10 detects a different vehicle M1 in the left front of the host vehicle M0, the hidden area calculator 32 calculates the hidden area R which is an area hidden behind the different vehicle M1 inside an area formed by straight lines extended from the host vehicle M0, and passing through corner portions P1, P2 of the different vehicle M1. Incidentally, the corner portions P1, P2 of the different vehicle M1 are two points whose are the farthest from the host vehicle M0 among the portions of the different vehicle M1.

Next, referring to FIGS. 4A to 4D and FIG. 5, descriptions will be provided for how to determine identification information about each of multiple objects in a case where the multiple objects enter a hidden area R. An arrow in FIGS. 4A to 4D represents a direction in which the vehicles are travelling.

Figure 4A:
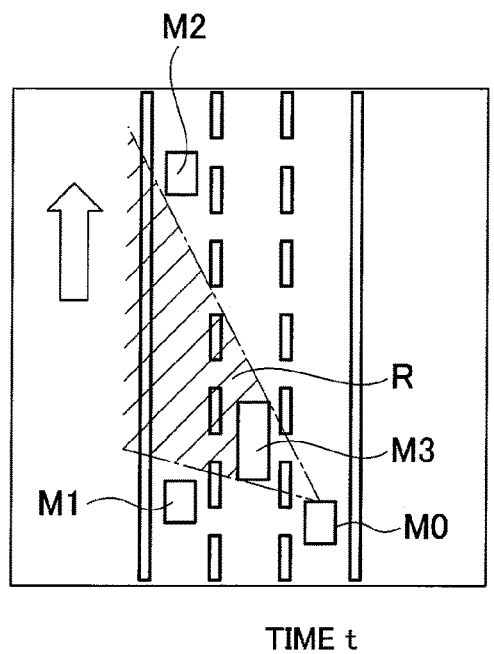
FIG. 4A is a diagram for explaining how to determine identification information about an object in the first embodiment of the present invention.

As illustrated in FIG. 4A, at time t, the object tracker 31 sets trackers T1 to T3 to different vehicles M1 to M3 existing around the host vehicle M0. Meanwhile, the identification number assigner 35 assigns identification numbers ID1 to ID3 to the different vehicles M1 to M3. Furthermore, the hidden area calculator 32 calculates a hidden area R which is hidden behind the different vehicle M3. Incidentally, illustrations of the trackers T1 to T3 are omitted from FIG. 4A, and also from FIGS. 4B to 4D.

Figure 4B:
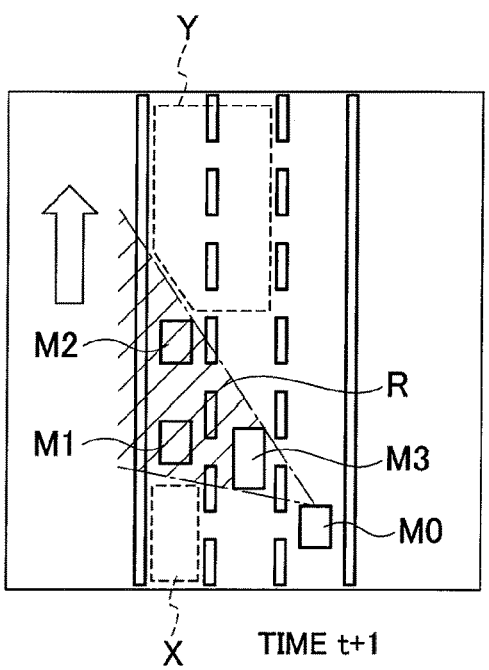
FIG. 4B is another diagram for explaining how to determine identification information about the object in the first embodiment of the present invention.

Thereafter, as illustrated in FIG. 4B, at time t+1, the different vehicles M1, M2 enter the hidden area R, and the object tracker 31 becomes unable to track the different vehicles M1, M2. In this case, the object tracker 31 sets the flags of the tracker T1, T2 set for the different vehicles M1, M2 at 1. Subsequently, based on the map information, the route calculator 34 calculates zones into which the different vehicles M1, M2 may come out of the hidden area R. In the example illustrated in FIG. 4B, the zones into which the different vehicles M1, M2 may come out of the hidden area R are zones X, Y.

After that, the positional relationship estimator 33 estimates a positional relationship between the different vehicles M1, M2 in the hidden area R. In the first embodiment, the positional relationship between multiple objects in a hidden area R include not only the positional relationship in the hidden area R, but also orders in which the multiple objects come out of the hidden area R. In the example illustrated in FIG. 4B, the positional relationship between the different vehicles M1, M2 indicates that the different vehicle M2 exists in front of the different vehicle M1. The positional relationship estimator 33 is capable of estimating a positional relationship between the different vehicles M1, M2 illustrated in FIG. 4B from the positional relationship between the different vehicles M1, M2 at time t. Thereafter, the positional relationship estimator 33 estimates orders in which the different vehicles M1, M2 may come out of the hidden area R into the zones X, Y. The order in which the vehicles M1, M2 may come out of the hidden area R into the zone X is estimated to be the vehicle M1 before the vehicle M2. In contrast, the order in which the vehicles M1, M2 may come out of the hidden area R into the zone Y is estimated to be the vehicle M2 before the vehicle M1. The positional relationship estimator 33 creates a table illustrated in FIG. 5 based on the estimated orders. In the table illustrated in FIG. 5, First Zone Y indicates that a first tracker which may come out of the zone Y is the tracker T2. In addition, Second Zone Y (First Zone Y) indicates that a second tracker which may come out of the zone Y after the detection of the first object having coming out of the zone Y is the tracker T1.

Figure 4C:
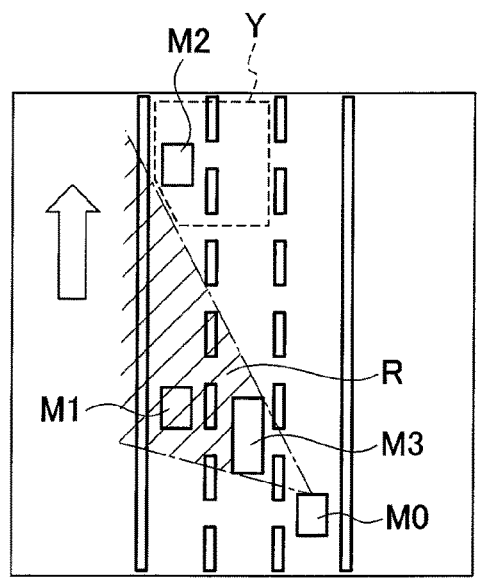
FIG. 4C is yet another diagram for explaining how to determine identification information about the object in the first embodiment of the present invention.

Next, the object detector 10 detects an object which comes out of the hidden area R. As illustrated in FIG. 4C, in a case where at time t+2, the different vehicle M2 comes out of the hidden area R into the zone Y first, the object tracker 31 refers to the table illustrated in FIG. 5, and continues associating information about the tracker T2 with the different vehicle M2. In addition, the object tracker 31 sets the flag of the tracker T2 at 0. Furthermore, the identification number assigner 35 continues assigning the identification number ID2 to the different vehicle M2.

Figure 4D:
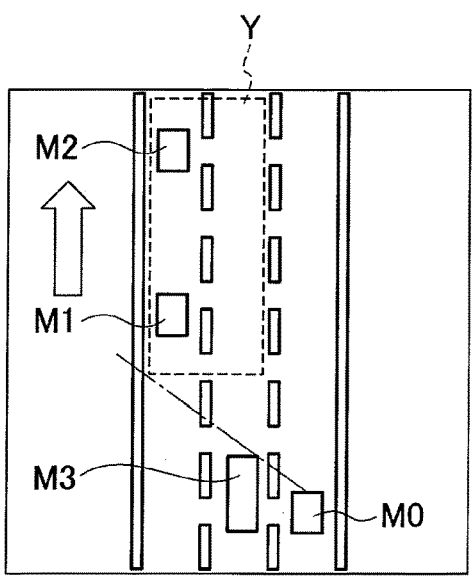
FIG. 4D is still another diagram for explaining how to determine identification information about the object in the first embodiment of the present invention.

Thereafter, as illustrated in FIG. 4D, in a case where at time t+3, the different vehicle M1 comes out of the hidden area R into the zone Y second, the object tracker 31 refers to the table illustrated in FIG. 5, and continues associating information about the first tracker T1 with the different vehicle M1. In addition, the object tracker 31 sets the flag of the tracker T1 at 0. Furthermore, the identification number assigner 35 continues assigning the identification number ID1 to the different vehicle M1.

Figure 6:
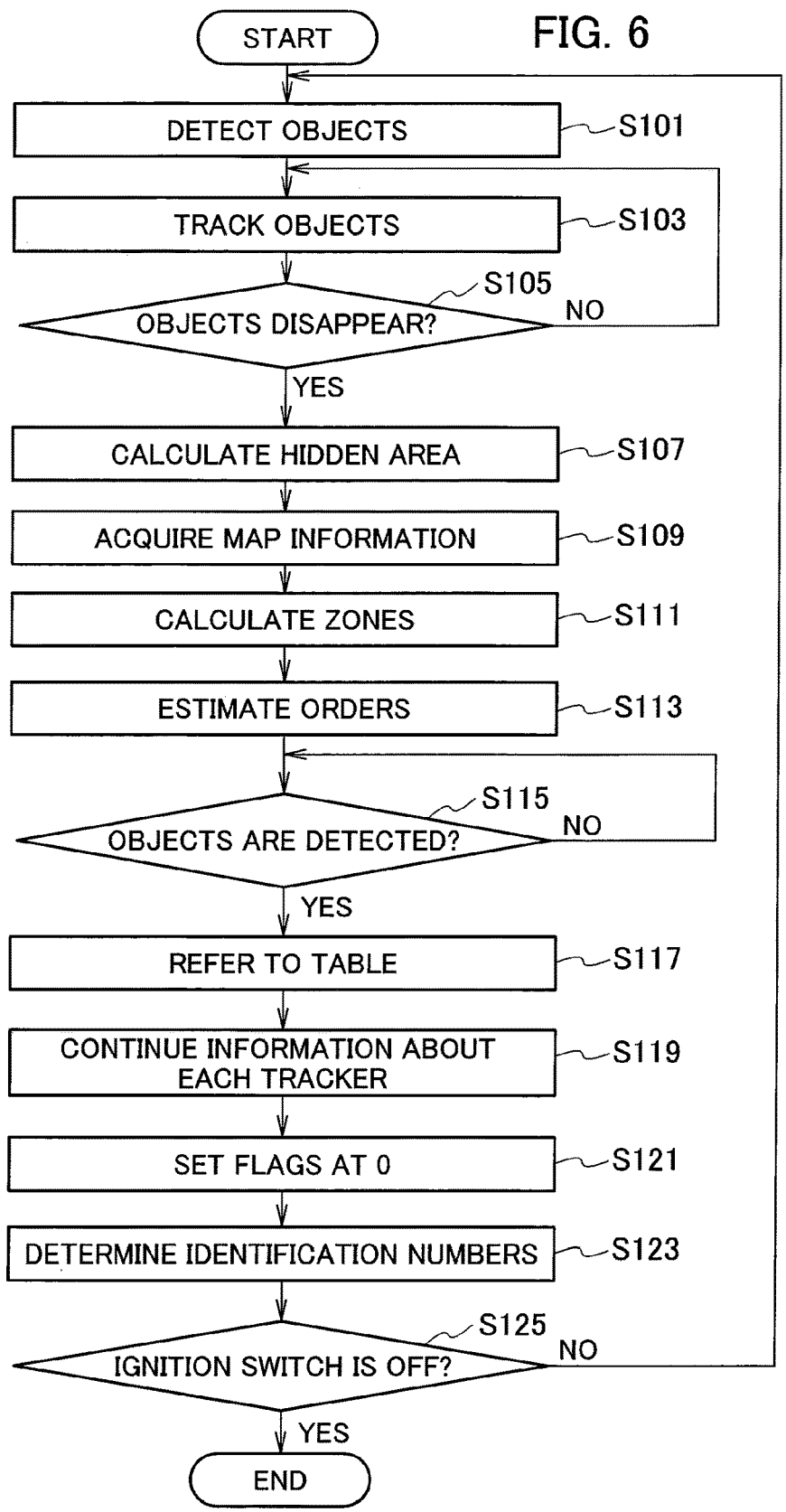
FIG. 6 is a flowchart for explaining an example of how the object tracking apparatus according to the first embodiment of the present invention works.

Next, referring to a flowchart illustrated in FIG. 6, descriptions will be provided for an example of how the object tracking apparatus 100 according to the first embodiment works. This flowchart starts when an ignition switch is turned on.

In step S101, the object detector 10 detects objects around the host vehicle.

In step S103, the object tracker 31 sets trackers to the respective objects, and starts to track the objects. Meanwhile, the identification number assigner 35 assigns identification numbers to the respective objects.

In step S105, the object tracker 31 determines whether multiple objects disappear. In a case where the multiple objects disappear (if Yes in step S105), the process proceeds to step S107. On the other hand, in a case where no multiple objects disappear (if No in step S105), the process returns to step S103. Furthermore, in the case where the object tracker 31 determines that the multiple objects disappear, the object tracker 31 sets the flags of the multiple objects at 1.

In step S107, the hidden area calculator 32 calculates a hidden area.

In step S109, the map information acquirer 20 acquires map information.

In step S111, based on the map information, the route calculator 34 calculates zones into which the objects may come out of the hidden area.

In step S113, the positional relationship estimator 33 estimates a positional relationship between the multiple objects in the hidden area. Moreover, based on the estimated positional relationship, the positional relationship estimator 33 estimates orders in which the multiple objects may come out of the hidden area into the zones.

In step S115, in a case where the object detector 10 detects objects which come out of the hidden area (if Yes in step S115), the process proceeds to step S117. On the other hand, in a case where the object detector 10 detects no such objects (if No in step S115), the process waits for the object detector 10 to detect objects which comes out of the hidden area.

In step S117, the object tracker 31 refers to the table created by the positional relationship estimator 33.

In step S119, based in a result of referring to the table, the object tracker 31 continues associating information about each tracker with the corresponding object.

In step S121, the object tracker 31 sets the flags of the continued trackers at 0.

In step S123, the identification number assigner 35 determines identification numbers to be assigned to the objects.

In step S125, the object tracking apparatus 100 determines whether the ignition switch is off. In a case where the ignition switch is on (if No in step S125), the process returns to step S101. In a case where the ignition switch is off (if Yes in step S125), the object tracking apparatus 100 terminates the series of the process.

As discussed above, the following working and effects can be obtained from the object tracking apparatus 100 according to the first embodiment.

In the case where the multiple objects enter the hidden area, the object tracking apparatus 100 estimates the positional relationship between the multiple objects in the hidden area. When the objects come out of the hidden area, the object tracking apparatus 100 determines identification information about each object based on the estimated positional relationship. Thereby, even in the case where the multiple objects enter the hidden area and temporarily disappear, the object tracking apparatus 100 is capable of preventing each object from being assigned wrong identification information different from that which is assigned to the object before the object is hidden, and can enhances the object tracking performance.

Moreover, in the case where the object tracking apparatus 100 can estimate the positional relationship between the multiple objects in the hidden area, the object tracking apparatus 100 continues associating the identification information assigned to each object with the object when the object comes out of the hidden area. Thereby, even in the case where the multiple objects enter the hidden area and temporarily disappear, the object tracking apparatus 100 is capable of preventing each object from being assigned wrong identification information different from that which is assigned to the object before the object is hidden, and can enhances the object tracking performance.

Second Embodiment

Next, descriptions will be provided for a second embodiment of the present invention. An object tracking apparatus 100 according to the second embodiment has the same configuration as the object tracking apparatus 100 according to the first embodiment. The second embodiment is different from the first embodiment in terms of the positional relationship between the multiple objects. The first embodiment has been discussed in which the positional relationship estimator 33 can estimate the positional relationship between the multiple objects in the hidden area. On the other hand, the second embodiment will be discussed in which the positional relationship estimator 33 cannot estimate the positional relationship between the multiple objects in the hidden area.

Figure 7A:
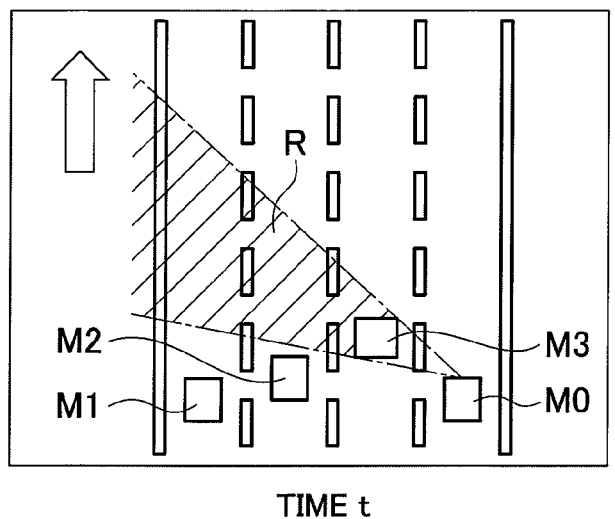
FIG. 7A is a diagram for explaining how to determine identification information about an object in a second embodiment of the present invention.

As illustrated in FIG. 7A, at time t, the objector tracker 31 sets trackers T1 to T3 for other vehicles M1 to M3 existing around the host vehicle M0. Meanwhile, the identification number assigner 35 assigns identification numbers ID1 to ID3 to the other vehicles M1 to M3.

Figure 7B:
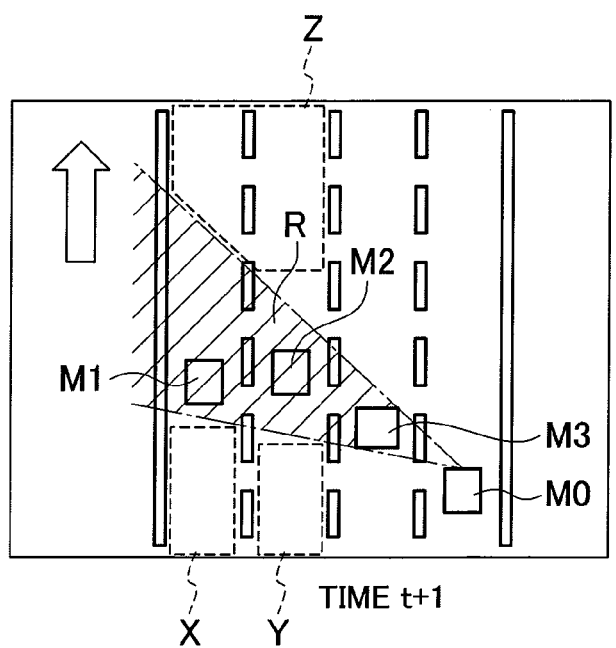
FIG. 7B is another diagram for explaining how to determine identification information about the object in the second embodiment of the present invention.

Thereafter, as illustrated in FIG. 7B, in a case where at time t+1, the different vehicles M1, M2 enter the hidden area R and the object tracker 31 becomes unable to track the different vehicles M1, M2, the object tracker 31 sets the flags of the trackers T1, T2 set for the different vehicles M1, M2 at 1. Thereafter, the route calculator 34 calculates zones X, Y, Z into which the different vehicles M1, M2 may come out of the hidden area R based on the map information.

Subsequently, the positional relationship estimator 33 estimates the positional relationship between the different vehicles M1, M2 in the hidden area R. The positional relationship estimator 33 estimates which different vehicle may come out of the hidden area R into the zones X, Y, Z, and an order in which the different vehicles M1, M2 may come out of the hidden area R into the zone Z. A vehicle which may come out of the hidden area R into the zone X is the different vehicle M1. Meanwhile, a vehicle which may come out of the hidden area R into the zone Y is the different vehicle M2. In the case illustrated in FIG. 7B, however, the positional relationship estimator 33 cannot estimate the order in which the different vehicles M1, M2 may come out of the hidden area R into the zone Z. The reason for this is that the different vehicle M1 or the different vehicle M2 may come out of the hidden area R into the zone Z after changing lanes. The positional relationship estimator 33 creates a table illustrated in FIG. 9 based on the estimated positional relationship.

Figure 7C:
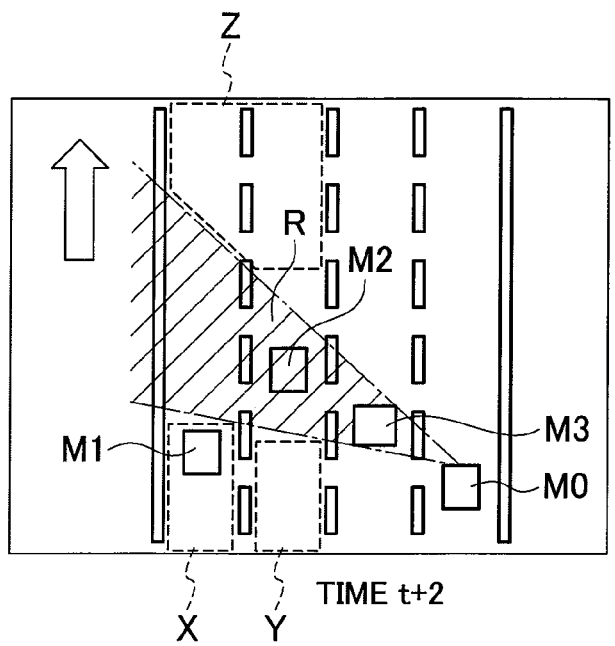
FIG. 7C is yet another diagram for explaining how to determine identification information about the object in the second embodiment of the present invention.

After that, the object detector 10 detects an object which comes out the hidden area R. As illustrated in FIG. 7C, in a case where at time t+2, the different vehicle M1 comes out of the hidden area R into the zone X first, the object tracker 31 refers to the table illustrated in FIG. 9, continues associating the information about the tracker T1 with the different vehicle M1, and sets the flag of the tracker T1 at 0. Meanwhile, the identification number assigner 35 continues assigning the identification number ID1 to the different vehicle M1.

Figure 7D:
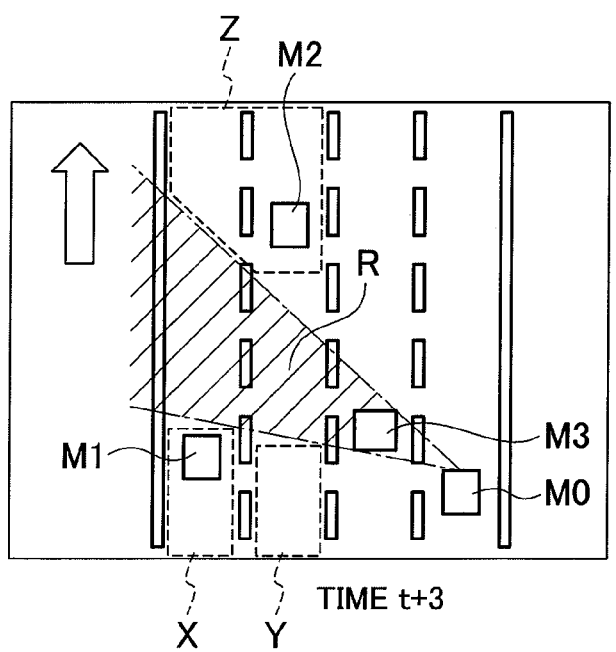
FIG. 7D is still another diagram for explaining how to determine identification information about the object in the second embodiment of the present invention.
Figure 8A:
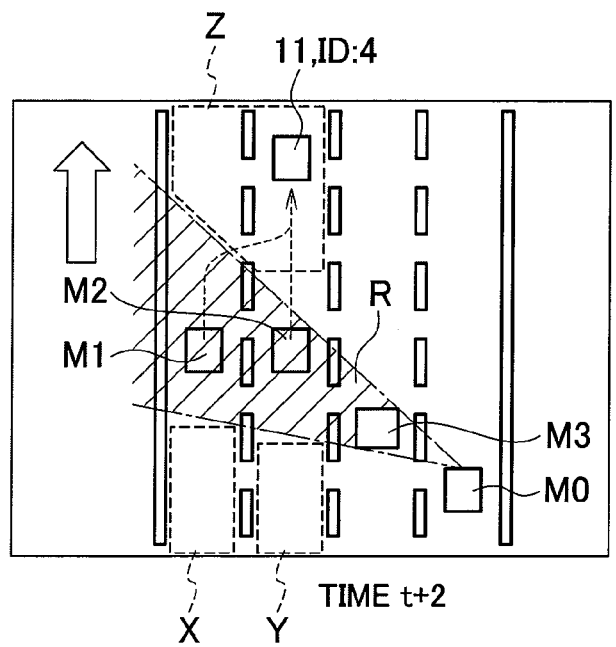
FIG. 8A is a diagram for explaining how to determine identification information about the object in the second embodiment of the present invention.
Figure 8B:
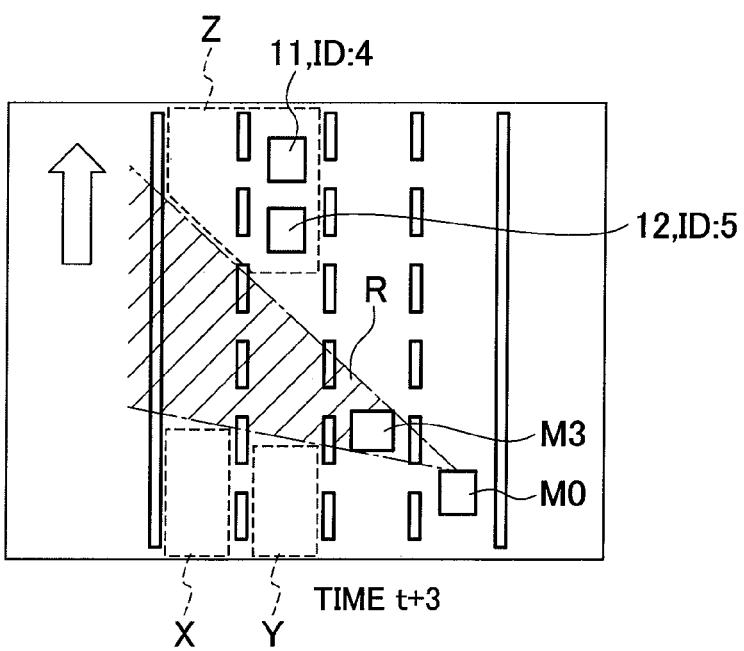
FIG. 8B is another diagram for explaining how to determine identification information about the object in the second embodiment of the present invention.
Figures 8C, 9:
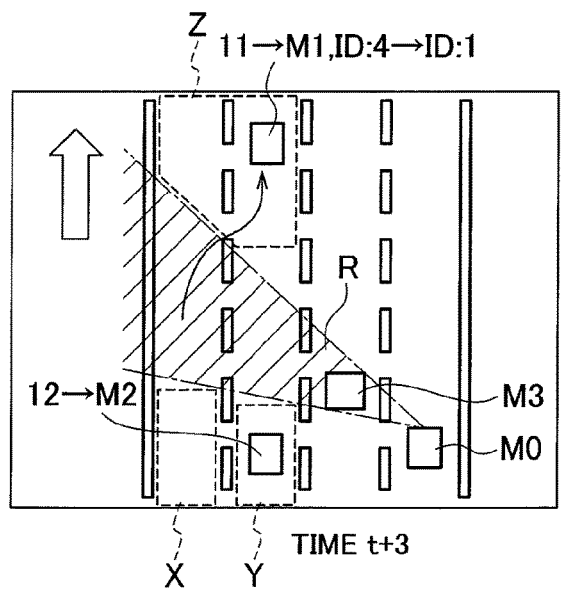
FIG. 8C is yet another diagram for explaining how to determine identification information about the object in the second embodiment of the present invention.
FIG. 9 is a diagram for explaining a tracker of an object which comes out of a hidden area in the second embodiment of the present invention.

Thereafter, as illustrated in FIG. 7D, in a case where at time t+3, the different vehicle M2 comes out of the hidden area R into the zone Z second, the object tracker 31 refers to the table illustrated in FIG. 9, continues associating the information about the tracker T2 with the different vehicle M2, and sets the flag of the tracker T2 at 0. Meanwhile, the identification number assigner 35 continues assigning the identification number ID2 to the different vehicle M2.

On the other hand, as illustrated in FIG. 8A, in a case where at time t+2, the object detector 10 detects the object 11 which comes out of the hidden area R into the zone Z first, the object tracker 31 cannot determine whether the object 11 is the different vehicle M1 or the different vehicle M2. For this reason, the object tracker 31 refers to the table illustrated in FIG. 9, and sets a new tracker T4 to the object 11. Meanwhile, the identification number assigner 35 assigns a new identification number ID4 to the object 11. In this event, the object tracker 31 retains, but does not delete, the information about the tracker T1 and the information about the tracker T2.

After that, as illustrated in FIG. 8B, in a case where at time t+3, the object detector 10 detects the object 12 which comes out of the hidden area R into the zone Z second, the object tracker 31 cannot determine whether the object 12 is the different vehicle M1 or the different vehicle M2. For this reason, the object tracker 31 refers to the table illustrated in FIG. 9, and sets a new tracker T5 to the object 12. Meanwhile, the identification number assigner 35 assigns a new identification number ID5 to the object 12. In this event, since the number of assigned new identification numbers is just equal to the number (two) of objects which have existed in the hidden area R, the object tracker 31 determines that no object exists in the hidden area R, and deletes the information about each of the trackers T1, T2 which the object tracker 31 has retained until now. In other words, in the case where the number of assigned new identification numbers is just equal to the number of objects having entered the hidden area R, the object tracker 31 deletes the information which the object tracker 31 has retained.

On the other hand, as illustrated in FIG. 8C in a case where at time t+3, the object detector 10 detects the object 12 which comes out of the hidden area R into the zone Y second, the object tracker 31 can determine that the object 12 is the different vehicle M2 by referring to the table illustrated in FIG. 9. Thereby, the object tracker 31 can determine that the object 11 is the different vehicle M1. Accordingly, the object tracker 31 continues associating the information about the tracker T1 and the information about the tracker T2 with the respective different vehicles M1, M2, and sets the flags of the trackers T1, T2 at 0. Meanwhile, the identification number assigner 35 deletes the identification number ID4 which is newly assigned to the different vehicle M1 at time t+2, and continuously assigns the identification number ID1 to the different vehicle M1. In addition, the he identification number assigner 35 continuously assigns the identification number ID2 to the different vehicle M2.

Figure 10:
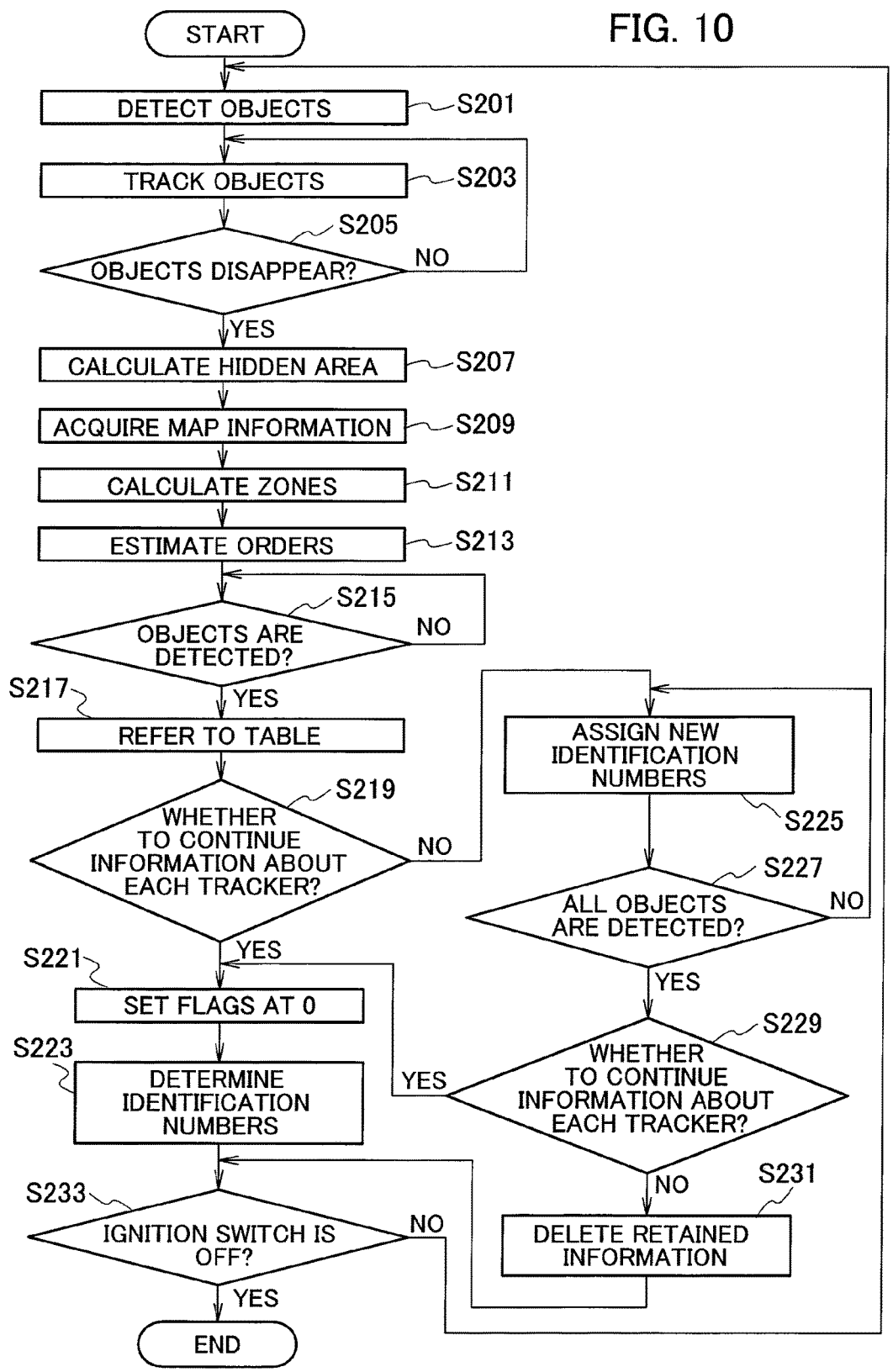
FIG. 10 is a flowchart for explaining an example of how an object tracking apparatus according to the second embodiment of the present invention works.

Next, referring to a flowchart illustrated in FIG. 10, descriptions will be provided for an example of how the object tracking apparatus 100 according to the second embodiment works. This flowchart starts when the ignition switch is turned on. Incidentally, operations in steps S201 to S217, steps S221 to S223 and step S233 are the same as those in steps S101 to S117, steps S121 to S123 and step S125 in FIG. 6, and detailed descriptions will be omitted. Descriptions will be provided for only what makes the flowchart in FIG. 10 different from the flowchart in FIG. 6.

In step S219, the object tracker 31 determines whether to continue the information about each tracker. In a case where the object tracker 31 can continue the information about each tracker (if Yes in step S219), the process proceeds to step S221. On the other hand, in a case where the object tracker 31 cannot continue the information about each tracker (if No in step S219), the process proceeds to step S225.

In step S225, the identification number assigner 35 assigns a new identification number to an object which comes out of the hidden area R.

In a case where all of the objects having entered the hidden area R are detected in step S227 (if Yes in step S227), the process proceeds to step S229. In a case where some of the objects having entered the hidden area R are not detected (if No in step S227), the process returns to step S225.

In step S229, the object tracker 31 again determines whether to continue the information about each tracker. Depending on an order in which the objects come out of the hidden area R, the object tracker 31 can continue the information about each tracker. In a case where the object tracker 31 can continue the information about each tracker (if Yes in step S229), the processor proceeds to step S221. On the other hand, in a case where the object tracker 31 cannot continue the information about each tracker (if No in step S229), the processor proceeds to step S231.

In step S231, the object tracker 31 deletes the information about each tracker which the object tracker 31 has retained until now.

As discussed above, the following working and effects can be obtained from the object tracking apparatus 100 according to the second embodiment.

In the case where the object tracking apparatus 100 cannot estimate the positional relationship between the multiple objects in the hidden area, the object tracking apparatus 100 assigns new identification information to each object when the object comes out of the hidden area. Thereby, even in the case where the multiple objects enter the hidden area and temporarily disappear, the object tracking apparatus 100 is capable of preventing each object from being assigned wrong identification information different from that which is assigned to the object before the object is hidden. As far as Patent Literature 1 is concerned, however, in the case illustrated in FIG. 8A, the object which comes out of the hidden area R first is the different vehicle M1, but there is likelihood that the object which comes out of the hidden area R first is determined as being the different vehicle M2. In this case, it is determined that the host vehicle M0 will be able to overtake the different vehicle M3 and enter the left lane from the current lane. This is because it is determined that the different vehicle M2 has come out of the hidden area R. There is likelihood, however, that if the different vehicle M2 actually exists in the hidden area R and is going to enter the right lane from the current lane, the course of the different vehicle M2 may cross the course of the host vehicle M0. In contrast, the object tracking apparatus 100 according to the second embodiment assigns new identification information to the object 11 which comes out of the hidden area R, and does not delete the information about the different vehicle M1 or the information about the different vehicle M2. This makes it possible for the object tracking apparatus 100 to perform a reliable driving action.

In addition, the object tracking apparatus 100 continues determining that an object(s) exists in the hidden area, until the object tracking apparatus 100 finishes assigning new identification information to each of the objects which have existed in the hidden area. Once finishing assigning the new identification information to each object which have existed in the hidden area, the object tracking apparatus 100 deletes all the old identification information. Thereby, even in the case where the multiple objects enter the hidden area and temporarily disappear, the object tracking apparatus 100 is capable of preventing each object from being assigned wrong identification information different from that which is assigned to the object before the object is hidden, and can enhances the object tracking performance.

Third Embodiment

Next, descriptions will be provided for a third embodiment of the present invention. The configuration of the object tracking apparatus 100 according to the third embodiment is the same as that of the object tracking apparatus 100 according to the first embodiment. The third embodiment is different from the first embodiment in terms of the driving scene. The driving scene discussed in the first embodiment is a straight roadway which has no bifurcation. The driving scene to be discussed in the third embodiment will be a roadway which has a collision point.

Figure 11A:
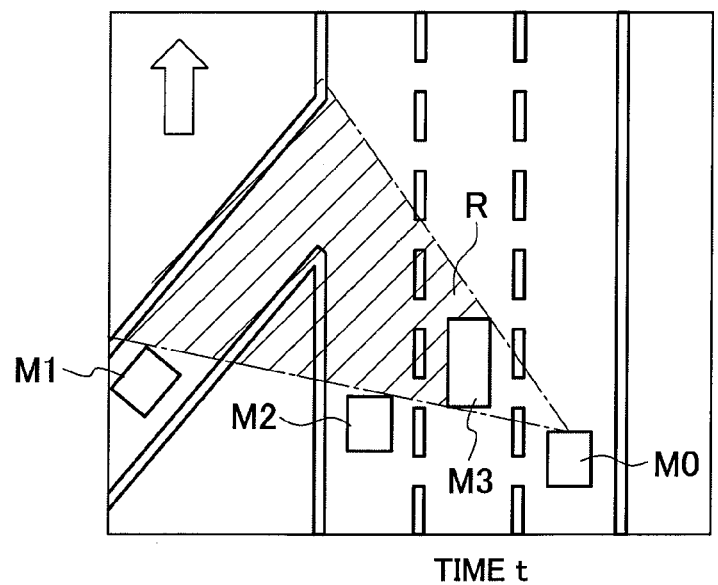
FIG. 11A is a diagram for explaining how to determine identification information about an object in a third embodiment of the present invention.
Figure 11B:
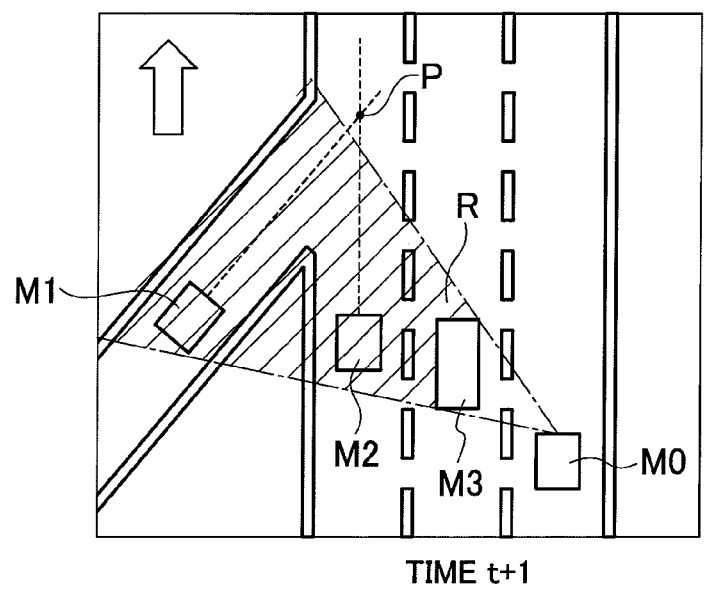
FIG. 11B is another diagram for explaining how to determine identification information about the object in the third embodiment of the present invention.
Figure 11C:
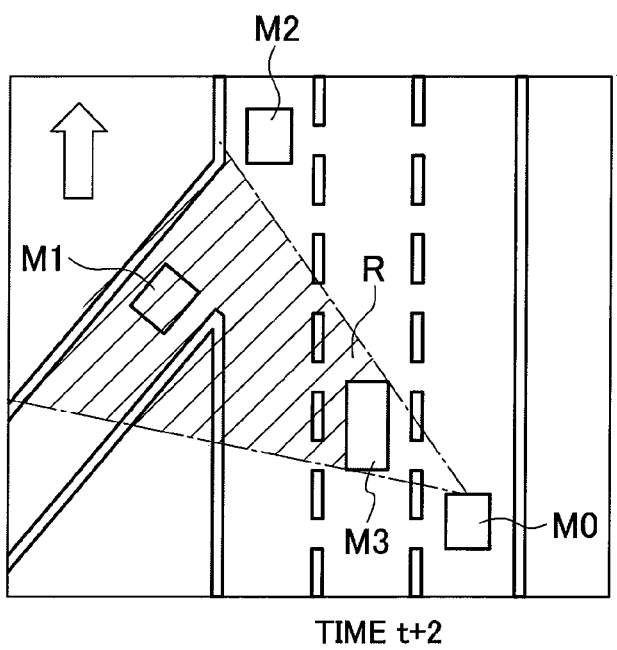
FIG. 11C is yet another diagram for explaining how to determine identification information about the object in the third embodiment of the present invention.

Referring to FIGS. 11A to 11C, descriptions will be provided for how the object tracking is performed on a roadway having a collision point like in a junction. Incidentally, in the third embodiment, the collision point means a point where the tracks of the respective different vehicles M1, M2 may collide with each other.

As illustrated in FIG. 11A, at time t, the object tracker 31 sets trackers T1 to T3 to different vehicles M1 to M3 existing around the host vehicle M0. Meanwhile, the identification number assigner 35 assigns identification numbers ID1 to ID3 to the different vehicles M1 to M3.

Thereafter, as illustrated in FIG. 11B, in a case where at time t+1, the different vehicles M1, M2 enter a hidden area R and the object tracker 31 becomes unable to track the vehicles M1, M2, the object tracker 31 sets the flags of the trackers T1, T2 set for the vehicles M1, M2 at 1. Subsequently, based on the map information, the route calculator 34 calculates a collision point P where the different vehicles M1, M2 may collide with each other. After that, the positional relationship estimator 33 estimates amounts of time T it takes for the different vehicles M1, M2 to reach the collision point P. Each amount of time T is expressed with Equation (1).

$$T=L/V \qquad \text{Equation (1)}$$

where L is a distance to the collision point P, and V is a speed at which an object runs before entering the hidden area R. Incidentally, in the third embodiment, the positional relationship between the multiple objects includes not only the positional relationship in the hidden area R, but also the amounts of time it takes for the multiple objects to reach the collision point P.

Using the amounts of time T, the object tracker 31 determines whether to continue the trackers. When the amount of time it takes for the different vehicle M1 to reach the collision point P is denoted by TM1 and the amount of time it takes for the different vehicle M2 to reach the collision point P is denoted by TM2, the time difference between the amounts of time TM1, TM2 it takes for the different vehicles M1, M2 to reach the collision point P is calculated as the amount of time TM2 minus the amount of time TM1. The object tracker 31 determines whether this time difference is not less than a predetermined amount of time (for example, 2 seconds). In a case where the time difference is equal to or greater than the predetermined amount of time, the object tracker 31 determines that the different vehicle M2 in a priority lane will reach the collision point P earlier than the different vehicle M1. In other words, as illustrated in FIG. 11C, at time t+2, the object tracker 31 determines that the object which comes out of the hidden area R is the different vehicle M2. The object tracker 31 continues information about the tracker T2 associated with the different vehicle M2, and sets the flag of the tracker T2 at 0. Meanwhile, the identification number assigner 35 continues assigning the identification number ID2 to the different vehicle M2.

Figure 12A:
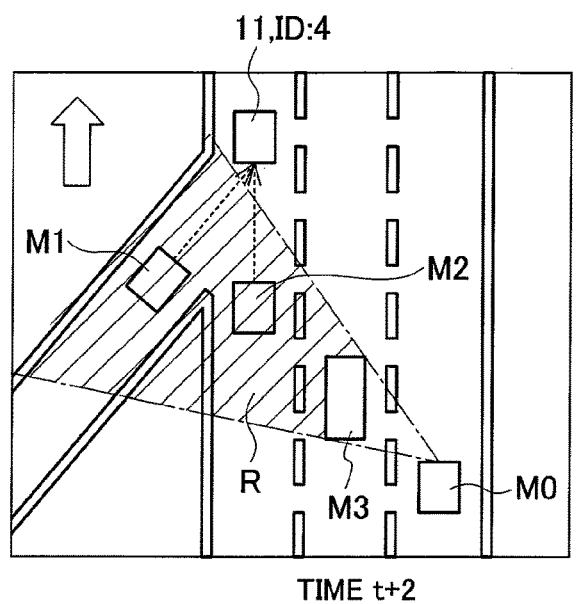
FIG. 12A is a diagram for explaining how to determine identification information about the object in the third embodiment of the present invention.

On the other hand, in a case where the time difference is less than the predetermined amount of time, when as illustrated in FIG. 12A, the object 11 which comes out of the hidden area R first is detected, the object tracker 31 cannot determine whether the object 11 is the different vehicle M1 or the different vehicle M2. The reason for this is that the object tracker 31 cannot determine which one of the different vehicles M1, M2 yields to the other. With this taken into consideration, the object tracker 31 sets a new tracker T4 to the object 11. Meanwhile, the identification number assigner 35 assigns a new identification number ID4 to the object 11. In this event, the object tracker 31 retains, but does not delete, the information about the tracker T1 and the information about the tracker T2.

Figure 12B:
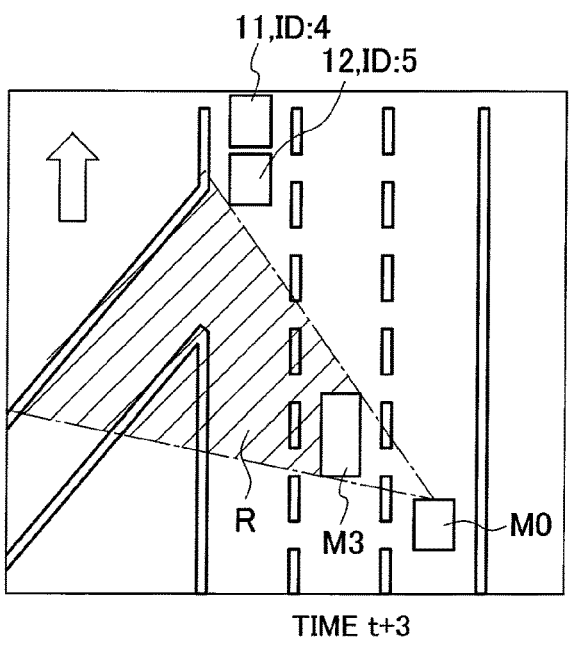
FIG. 12B is another diagram for explaining how to determine identification information about the object in the third embodiment of the present invention.

After that, when as illustrated in FIG. 12B, the object detector 10 detects the object 12 which comes out of the hidden area R second at time t+3, the object tracker 31 cannot determine whether the object 12 is the different vehicle M1 or the different vehicle M2. With this taken into consideration, the object tracker 31 sets a new tracker T5 to the object 12. Meanwhile, the identification number assigner 35 assigns a new identification number ID5 to the object 12. In this event, since the number of assigned new identification numbers is just equal to the number (two) of objects which have existed in the hidden area R, the object tracker 31 determines that no object exists in the hidden area R, and deletes the information about each of the trackers T1, T2 which the object tracker 31 has retained until now.

Figure 13:
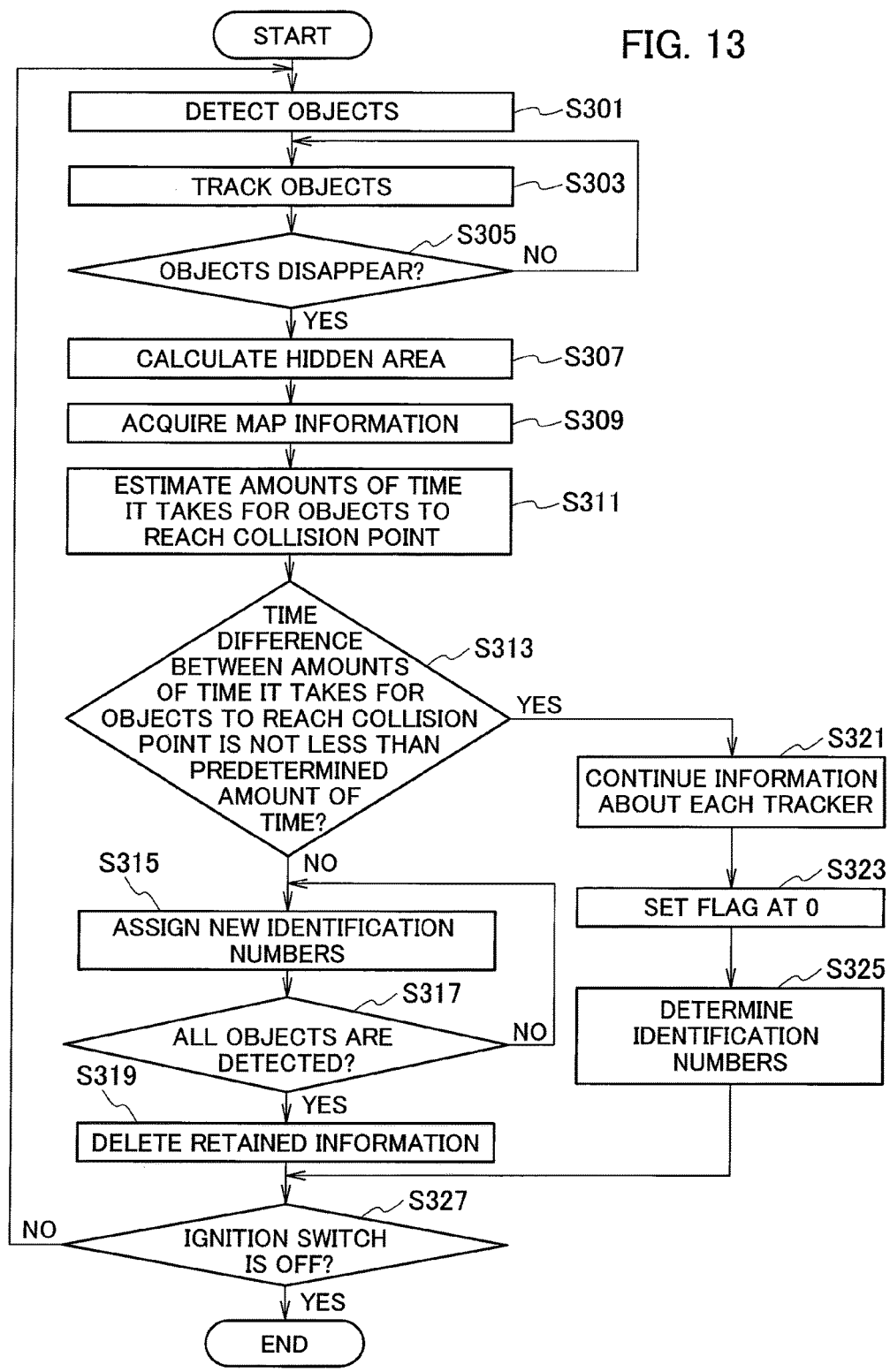
FIG. 13 is a flowchart for explaining an example of how an object tracking apparatus according to the third embodiment of the present invention works.

Next, referring to a flowchart illustrated in FIG. 13, descriptions will be provided for an example of how the object tracking apparatus 100 according to the third embodiment works. This flowchart starts when the ignition switch is turned on. Incidentally, operations in steps S301 to S309 and steps S321 to S327 are the same as those in steps S101 to S109 and steps S119 to S125 in FIG. 6, and detailed descriptions will be omitted. Descriptions will be provided for only what makes the flowchart in FIG. 13 different from the flowchart in FIG. 6.

In step S311, the positional relationship estimator 33 estimates the amounts of time it takes for the multiple objects to reach the collision point P.

In step S313, the object tracker 31 determines whether the time difference between the amounts of time it takes for the multiple objects to reach the collision point P is not less than the predetermined amount of time. In a case where the time difference is equal to or greater than the predetermined amount of time (if Yes in step S313), the process proceeds to step S321. On the other hand, in a case where the time difference is less than the predetermined amount of time (if No in steps S313), the process proceeds to step S315.

In step S315, the identification number assigner 35 assigns new identification numbers to the objects which come out of the hidden area.

In step S317, in a case where all of the objects which have entered the hidden area R are detected (if Yes in step S317), the process proceeds to steps S319. On the other hand, in a case where some of the objects which have entered the hidden area R are not detected (if No in step S317), the process returns to step S315.

In step S319, the object tracker 31 deletes the information about each tracker which the object tracker 31 has retained until now.

As discussed above, the following working and effects can be obtained from the object tracking apparatus 100 according to the third embodiment.

The object tracking apparatus 100 estimates the time difference between the amounts of time it takes for the objects to reach the collision point P. In the case where the time difference is less than the predetermined amount of time, the object tracking apparatus 100 assigns new identification information to each object when the object comes out of the hidden area. Thereby, even in the case where the multiple objects enter the hidden area and temporarily disappear, the object tracking apparatus 100 is capable of preventing each object from being assigned wrong identification information different from that which is assigned to the object before the object is hidden. As far as Patent Literature 1 is concerned, however, in the case illustrated in FIG. 12A, the object which comes out of the hidden area R first is the different vehicle M1, but there is likelihood that the object which comes out of the hidden area R first is determined as being the different vehicle M2. In this case, it is determined that the host vehicle M0 will be able to overtake the different vehicle M3 and enter the left lane from the current lane. This is because it is determined that the different vehicle M2 has come out of the hidden area R. There is likelihood, however, that if the different vehicle M2 actually exists in the hidden area R and is going to enter the right lane, the course of the different vehicle M2 may cross the course of the host vehicle M0. In contrast, the object tracking apparatus 100 according to the third embodiment assigns new identification information to the object 11 which comes out of the hidden area R, and does not delete the information about the different vehicle M1 or the information about the different vehicle M2. This makes it possible for the object tracking apparatus 100 to perform a reliable driving action.

The foregoing descriptions have been provided for the embodiments of the present invention. Descriptions or drawings which are parts of this disclosure shall not be construed as limiting the present invention. From this disclosure, various alternative embodiments, examples, operating techniques will be clear to those skilled in the art.

It should be noted that each function in the above-discussed embodiments can be implemented with one or more processing circuits. The processing circuits include programmed processors such as processing devices including electric circuits. The processing circuits further include an application-specific integration circuit (ASIC) arranged to perform the functions discussed for the embodiments, and a device such as a conventional circuit component.

Moreover, the present invention is applicable to an automatic drive vehicle which automatically runs along a travelling path.

REFERENCE SIGNS LIST 100 object tracking apparatus
10 object detector
20 map information acquirer
30 controller
31 object tracker
32 hidden area calculator
33 positional relationship estimator
34 route calculator
35 identification number assigner

The invention claimed is:

1. An object tracking method for an object tracking apparatus which includes a sensor for detecting an object around a moving body, and a controller for tracking the object based on a result of detecting the object, the object tracking method comprising:
   in a case where a plurality of objects enter a hidden area, estimating a positional relationship between the plurality of the objects in the hidden area,
      wherein the hidden area is within a detection range of the sensor,
      wherein the plurality of the objects are not detectable by the sensor when the plurality of objects are in the hidden area, and
      wherein the plurality of the objects are hidden in the hidden area by an object different from the plurality of the objects; and
   when the objects come out of the hidden area, determining identification information about each object based on the estimated positional relationship.

2. The object tracking method according to claim 1, wherein in a case where the positional relationship between the plurality of the objects in the hidden area can be estimated, the identification information determined for each object before the object enters the hidden area continues being assigned to the object when the object comes out of the hidden area.

3. The object tracking method according to claim 1, wherein in a case where the positional relationship between the plurality of the objects in the hidden area cannot be estimated, each object is assigned new identification information when the object comes out of the hidden area.

4. The object tracking method according to claim 3, wherein in a case where a time difference between amounts of time it takes for the plurality of the objects to reach a collision point where tracks of the plurality of the objects collide with each other is less than a predetermined amount of time, new identification information is assigned to each object when the object comes out of the hidden area.

5. The object tracking method according to claim 3, wherein until each object having existed in the hidden area is assigned the new identification information, it is determined that one or more objects exist in the hidden area.

6. An object tracking apparatus comprising:
   a sensor for detecting an object around a moving body; and
   a controller for tracking the object based on a result of detecting the object using the sensor, the controller configured to:
      in a case where a plurality of objects enter a hidden area, estimate a positional relationship between the plurality of the objects in the hidden area,
         wherein the hidden area is within a detection range of the sensor,
         wherein the plurality of the objects are not detectable by the sensor when the plurality of objects are in the hidden area, and
         wherein the plurality of the objects are hidden in the hidden area by an object different from the plurality of the objects; and
      when the objects come out of the hidden area, determine identification information about each object based on the estimated positional relationship.

* * * * *